W. D. HERSCHEL.
SCROLL SAWING-MACHINE.

No. 182,438.                    Patented Sept. 19, 1876.

Witnesses
John Becker
Jno. Haynes

W. D. Herschel
by his Attorneys
Brown & Allen

UNITED STATES PATENT OFFICE.

WILLIAM D. HERSCHEL, OF NEW YORK, N. Y., ASSIGNOR TO JOHN FIRST AND PAUL PRYIBIL, OF SAME PLACE.

IMPROVEMENT IN SCROLL-SAWING MACHINES.

Specification forming part of Letters Patent No. 182,438, dated September 19, 1876; application filed May 13, 1876.

*To all whom it may concern:*

Be it known that I, WILLIAM D. HERSCHEL, of the city, county, and State of New York, have invented an Improvement in Scroll-Sawing Machines; and I do hereby declare that the following is a full, clear, and exact description of the same, reference being had to the accompanying drawing, which forms part of this specification.

My invention has for its object such a construction of scroll-sawing machines that the same may be practically and safely run at high speeds without undue jarring or unsteadiness, and in such a manner that at the end of both the downward and upward stroke of the saw, the saw shall be slightly drawn away from the material operated upon by the same to allow the thorough clearance of sawdust, and prevent the clogging of the saw-teeth by said sawdust.

The invention consists in a novel construction and arrangement of the springs and lever which carry the upper part of the saw, and give tension to the same; and the invention further consists in novel means of rendering the motion of the bottom of the saw parallel till it has nearly reached the end of either the upward or downward stroke, and then withdrawing the saw slightly from the material sawed to give increased clearance for sawdust and prevent the same from clogging the teeth of the saw.

Figure 1:
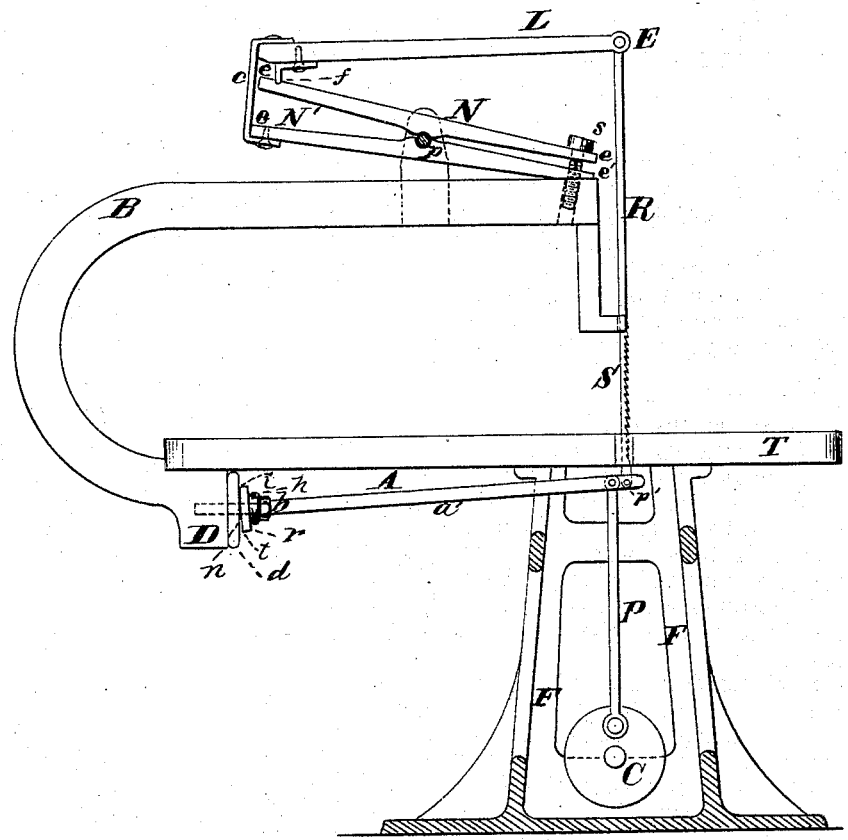
Figure 2:
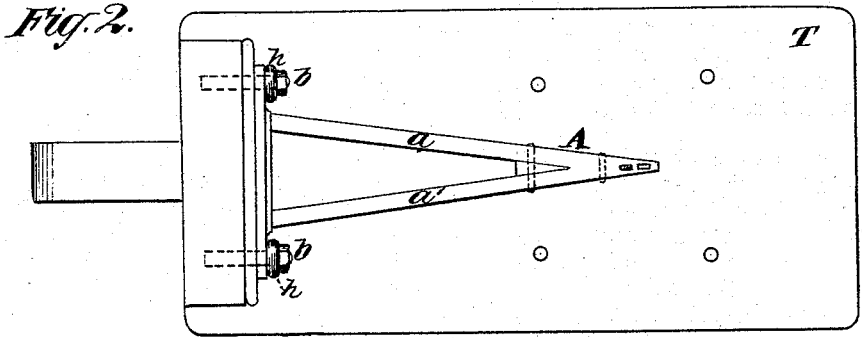
Figure 3:
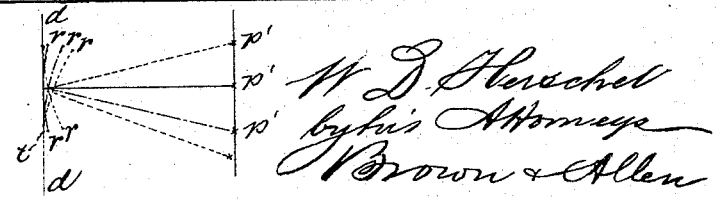

Figure 1 in the accompanying drawing is a side elevation of my improved scroll-sawing machine, a portion of the frame which supports the table being broken away to show the working parts under said table. Fig. 2 is an under side view of the table and a portion of the attachment thereof. Fig. 3 is a geometrical diagram which will be used in illustrating the action of the rocker-arm, to which the lower end of the saw is attached.

F is the frame which supports the table T. C is the crank-wheel, which imparts motion to saw S through the pitman P, and the rocking arm A, pivoted to both said pitman and saw. R is the rod which connects the top of the saw S with the extremity E of the oscillating lever L, to which said rod is pivoted. N N' are springs arranged and constructed to impart, in connection with the oscillating lever L and connecting-rod R, an upward movement to the saw, the wheel C, pitman P, and rocking arm A imparting a downward motion to said saw, and the two movements causing said saw to reciprocate. The springs N N' and the lever L may be supported by a bent arm, B, attached to and rising from the table, or to a support independent of the table attached to the ceiling or the side of a room, or to a pillar. The said springs are attached to the arm or other support, which sustains them in proper relation with the saw by a screw, $s$, and a pin, $p$, a short pillar, $m$, acting as an intermediate support for the pin $p$, which supports the said springs at or about midway between their extremities $e\ e\ e'\ e'$. The screw $s$ passes through the extremities $e\ e'$ of the springs N N' nearest the rod R, and also into the end of the bent arm B.

The fulcrum $f$ of the lever L rests on that end of the spring N which lies farthest from the rod R, and the short arm of the lever L is connected with that end of the spring N' farthest from the rod R by a flexible strap, $c$, or by a link or other means which will permit the free action of the said springs and lever.

Parallel motion of the upper end of the saw is secured by means of a slide running in guideways, or by other suitable means not shown in the drawing.

By this construction and arrangement of parts a very quick, because short, action of the springs is secured, the springs, if uniform in strength, acting equally on both sides of the pivot $p$, and a motion equal to the sum of all their deflections being transmitted to the short arm of the lever L, thus moving the extremity E of the lever L through an arc as many times greater than that described by the extremity of the short arm of said lever as the said long arm is longer than the short arm of said lever. Easy adjustment of the tension of the saw is secured through the action of the screw $s$. The rocking arm A, to one end of which the saw S and pitman P are pivoted, is preferably made with bifurcations $a\ a'$, the ends of which are attached to the rocker $r$, which rocks against the soft facing $d$ of the vertical plane surface of a downward projection, D, attached to the table T. The surface of the rocker $r$, which rocks against the plane surface $n$ of the facing $d$, has the curvature of the arc of a circle described from the center of the pivot $p'$, and the arc of curvature is made short enough to allow the angles $t$ of said rocker to act respectively against the plane surface $n$ of the soft facing $d$ a little before the saw reaches the end of its stroke. The length of the arc of curvature of the rocker $r$ which rocks against the plane surface $n$ is, therefore, shorter than the stroke of the saw; for, if the curved face of said rocker were made long enough, the length of the arc of said curved surface which would be brought in contact with said plane surface would be precisely the length of the stroke; because the motion of the center of a circle rolled or rocked on a plane is in a line parallel to the plane on which the circle rocks or rolls, and through a distance measured by the arc brought in contact with the plane. This lessening of the arc of curvature of the rocker, to render such arc shorter than the stroke of the saw, and thus to cause the angles $t\,t$ on said rocker alternately to act against the plane surface $n$, is an important feature of my invention, as is hereinafter explained.

In the diagram, Fig. 3, is shown the relative position of the arc of curvature of the rocker $r$ against the plane surface of the facing $d$, the parallelism of the different positions of the center of the pivot $p'$, so long as the curved surface of the rocker rests against said facing, and the recession of the center of the pivot $p'$ when either of the angles $t$ of the rocker $r$ acts against said facing. The rocker $r$ lies between the facing $d$ and springs $h$, which render the action of said rocker noiseless, and the said rocker $r$ and springs $h$ are held in position by bolts $b$, or other suitable means.

The soft facing $d$, which, together with the springs $h$, renders the actions of the rockers $r$ noiseless, is fixed to the plane surface of the downward projection D, attached to the under side of the table T in such manner that the surface of said soft facing upon which the rocker $r$ rocks is tangent to a circle touching said facing-surface, and drawn from the center of the pivot $p'$.

I claim—

1. The combination of the springs N N', constructed and arranged substantially as described, with the oscillating lever L, having its fulcrum $f$ on that end of the spring N farthest from the connecting-rod R, to which said lever L is pivoted, substantially as and for the purpose described.

2. The combination of the rocker $r$, having the angles $t\,t$, with the plane-surfaced soft packing $d$ interposed between said rocker and the plane surface $n$, and attached to the plane surface $n$, the rocking arm A, and the saw S, substantially as and for the purpose set forth.

In testimony whereof I hereunto sign my name this 29th day of April, 1876, in the presence of two subscribing witnesses.

W. D. HERSCHEL.

Witnesses:
MICHAEL RYAN,
FRED. HAYNES.